(12) United States Patent
Penven et al.

(10) Patent No.: US 11,465,373 B2
(45) Date of Patent: Oct. 11, 2022

(54) METHOD FOR MANUFACTURING AN AIRCRAFT CENTRE WING BOX INCLUDING AT LEAST ONE STIFFENER HAVING AT LEAST ONE THROUGH-HOLE AND AIRCRAFT CENTRE WING BOX OBTAINED USING SAID METHOD

(71) Applicant: Airbus Operations S.A.S., Toulouse (FR)

(72) Inventors: Benoît Penven, Grenade sur Garonne (FR); Guillaume Vivien, Brains (FR); Nicolas Fordos, Reze (FR); Jago Pridie, Nantes (FR)

(73) Assignee: Airbus Operations S.A.S.

( * ) Notice: Subject to any disclaimer, the term of this patent is extended or adjusted under 35 U.S.C. 154(b) by 207 days.

(21) Appl. No.: 16/704,507

(22) Filed: Dec. 5, 2019

(65) Prior Publication Data
US 2020/0180241 A1 Jun. 11, 2020

(30) Foreign Application Priority Data

Dec. 11, 2018 (FR) ...................... 18 72706

(51) Int. Cl.
*B29C 70/40* (2006.01)
*B29C 70/44* (2006.01)
(Continued)

(52) U.S. Cl.
CPC .............. *B29C 70/446* (2013.01); *B64C 1/26* (2013.01); *B64F 5/10* (2017.01); *B29L 2031/3085* (2013.01)

(58) Field of Classification Search
CPC ....... B29C 70/446; B29C 73/02; B29C 70/32; B64F 5/10; B64C 1/26; B29L 2031/3085; B29D 99/00
See application file for complete search history.

(56) References Cited

U.S. PATENT DOCUMENTS

| 9,114,582 | B2 * | 8/2015 | Blot ......................... B64F 5/10 |
| 2013/0206324 | A1 | 8/2013 | Blot et al. |
| 2020/0016855 | A1 * | 1/2020 | Krishnaswamy ....... B29C 73/02 |

FOREIGN PATENT DOCUMENTS

| EP | 2590856 A1 | 5/2013 |
| EP | 3208187 A1 | 8/2017 |
| FR | 3030443 A1 | 6/2016 |

OTHER PUBLICATIONS

French Search Report for Application No. FR1872706, dated Aug. 9, 2019, pp. 1-2.

* cited by examiner

*Primary Examiner* — Matthew J Daniels
*Assistant Examiner* — Shibin Liang
(74) *Attorney, Agent, or Firm* — Lerner, David, Littenberg, Krumholz & Mentlik, LLP

(57) ABSTRACT

A method for manufacturing a centre wing box which includes inner stiffeners, at least one of which has at least one through-hole is described. For each stiffener having at least one through-hole and having a first leg of a first U-shaped and C-shaped profile and a second leg of a second U-shaped and C-shaped profile, the method includes, for each through-hole, the steps of producing a first section of the through-hole in the first U-shaped or C-shaped profile and of producing a second section of the through-hole in the second U-shaped or C-shaped profile before the first and second U-shaped or C-shaped profiles are positioned on the mould.

9 Claims, 7 Drawing Sheets

(51) Int. Cl.
    *B64F 5/10*       (2017.01)
    *B64C 1/26*       (2006.01)
    *B29L 31/30*     (2006.01)

METHOD FOR MANUFACTURING AN AIRCRAFT CENTRE WING BOX INCLUDING AT LEAST ONE STIFFENER HAVING AT LEAST ONE THROUGH-HOLE AND AIRCRAFT CENTRE WING BOX OBTAINED USING SAID METHOD

FIELD OF THE INVENTION

The present invention relates to a method for manufacturing an aircraft centre wing box including at least one stiffener having at least one through-hole and an aircraft centre wing box obtained using said method.

BACKGROUND OF THE INVENTION

An aircraft comprises a centre wing box in order to connect the wings to the fuselage. This centre wing box comprises an upper panel, a lower panel, a front spar and a rear spar. Each panel or spar is reinforced and comprises, at the internal face thereof (oriented toward the centre of the centre wing box), stiffeners.

According to one configuration described in the document EP2590856, the centre wing box is produced from composite material by laying fibre reinforcements around a mould having four faces and a section identical to that of the centre wing box. To obtain the stiffeners, composite material profiles, having a U-shaped section at each face of the mould and a C-shaped section at each edge of the mould, are placed entirely around the mould before laying the fibre reinforcements around the mould. Each U-shaped profile comprises a base and two legs approximately perpendicular to the base. Each C-shaped profile comprises an L-shaped central part and two legs on either side of the L-shaped central part.

The U-shaped and C-shaped profiles are juxtaposed such that the legs of two adjacent profiles are placed against one another in order to form a stiffener and such that the bases and the L-shaped central parts of the profiles are pressed against the mould. The mould comprises, on the circumference thereof, a plurality of grooves configured to each house two side-by-side-placed legs of two U-shaped or C-shaped juxtaposed profiles.

Next, fibre reinforcements are laid, by winding for example, over the bases and the L-shaped central parts of the U-shaped and C-shaped profiles.

Once the fibre reinforcements have been put in place, the assembly formed by the profiles and the fibre reinforcements is polymerized.

After polymerization, drainage holes must be produced at the stiffeners of the lower panel. According to an embodiment, each of these drainage holes is produced by boring, using a drill for example, and then the drainage holes bored in this manner are painted. Given the number thereof, producing these holes is time-consuming and tedious. This operation is all the more complex since it must be carried out inside the box.

BRIEF SUMMARY OF THE INVENTION

Aspects of the present invention may overcome all or some of the disadvantages of the prior art.

An aspect of the invention is a method for manufacturing a centre wing box of an aircraft comprising stiffeners, at least one of said stiffeners having at least one through-hole, said centre wing box being produced from a plurality of U-shaped and C-shaped profiles and from an external skin, the U-shaped or C-shaped profiles each having a central part and two legs on either side of the central part, the manufacturing method comprising the following steps of:

laying juxtaposed U-shaped and C-shaped profiles entirely around a mould such that first and second legs of two adjacent U-shaped or C-shaped profiles are placed side by side against one another in order to form a stiffener, laying the external skin on the central parts of the U-shaped and C-shaped profiles, polymerization, and removal from the mould.

According to an aspect of the invention, the method for manufacturing the centre wing box is characterized in that, for each stiffener having at least one through-hole and comprising a first leg of a first U-shaped and C-shaped profile and a second leg of a second U-shaped and C-shaped profile, the method comprises, for each through-hole, the steps of producing a first section of the through-hole in the first U-shaped or C-shaped profile and of producing a second section of the through-hole in the second U-shaped and C-shaped profile before the first and second U-shaped or C-shaped profiles are positioned on the mould.

Thus, according to an aspect of the invention, the through-holes are not produced from inside the centre wing box. Producing the through-holes is easier for the operators since they are each obtained by producing first and second sections independently of one another while the U-shaped or C-shaped profiles are not yet assembled.

According to another feature of the invention, the first and second sections of each through-hole are produced before the U-shaped or C-shaped profiles are totally polymerized.

According to another feature of the invention, each first or second section of each through-hole is filled in using a temporary plug before the U-shaped or C-shaped profiles are positioned on the mould, each temporary plug being removed after the step for polymerizing the centre wing box.

According to another feature of the invention, each temporary plug has a height substantially equal to a thickness of the first or second leg in which the first or second section filled in by the temporary plug is provided.

According to another feature of the invention, each temporary plug has a diameter equal to or very slightly less than that of the first or second section filled in thereby before the polymerization step.

According to another feature of the invention, each temporary plug has a diameter equal to or very slightly greater than that of the first or second section filled in thereby before the polymerization step and it is produced from a slightly compressible material such as to be insertable into the first or second section in the slightly compressed state.

According to one embodiment, each temporary plug is produced from silicone elastomer.

According to another feature, each temporary plug has a cylindrical shape.

Another subject matter of the invention is a centre wing box obtained using the manufacturing method according to one of the preceding features.

BRIEF DESCRIPTION OF THE DRAWINGS

Other features and advantages will emerge from the following description of the invention, which description is given solely by way of example, with reference to the appended drawings wherein.

DETAILED DESCRIPTION

Figure 1:
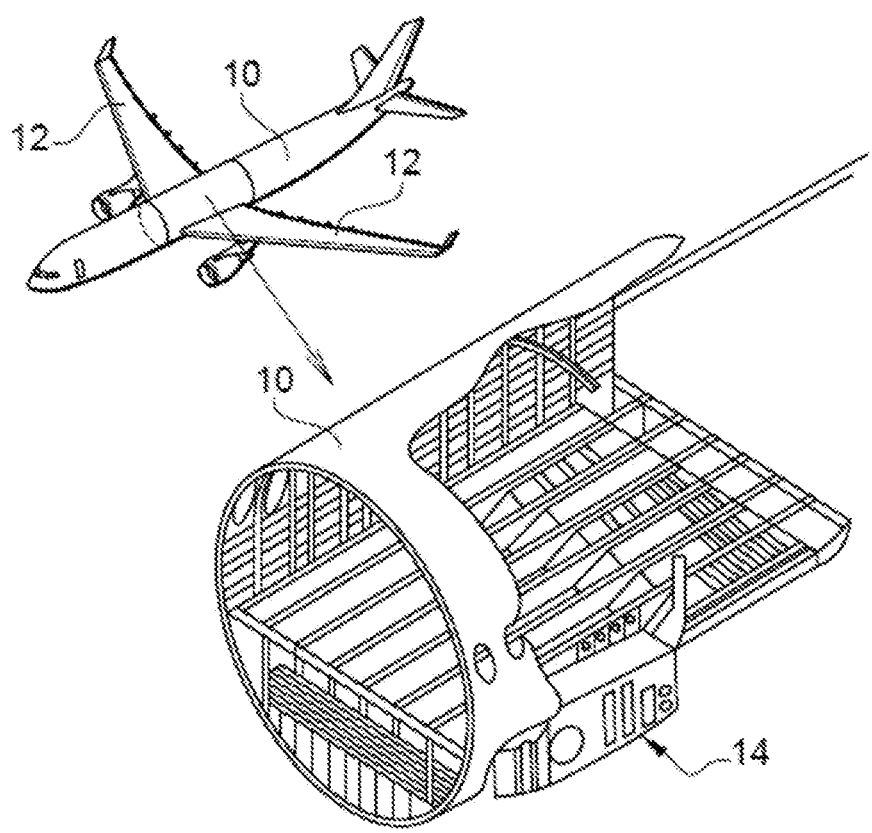
FIG. 1 is a part of a fuselage of an aircraft which comprises a centre wing box.
Figure 2:
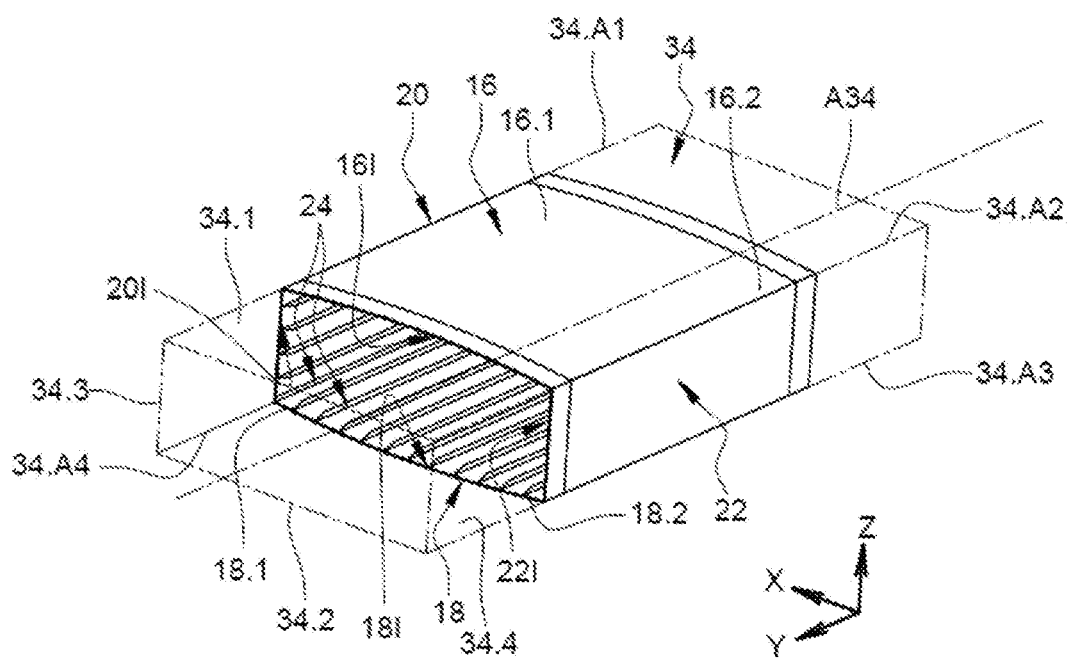
FIG. 2 is a perspective view of a centre wing box.

As illustrated in FIG. 1, the structure of an aircraft comprises a fuselage 10 and a wing unit 12 that are linked by means of a centre wing box 14. According to an embodiment illustrated in FIG. 2, the centre wing box 14 comprises an upper panel 16, a lower panel 18, a front spar 20 and a rear spar 22.

The upper panel 16 has a front border 16.1 and a rear border 16.2 substantially parallel to one another. The lower panel 18 has a front border 18.1 and a rear border 18.2 that are substantially parallel to one another. The front borders 16.1 and 18.1 of the upper and lower panels 16, 18 are connected by the front spar 20 and the rear borders 16.2 and 18.2 of the upper and lower panels 16, 18 are connected by the rear spar 22.

The front and rear spars 20, 22 are substantially planar and parallel and are perpendicular to a longitudinal direction X. The front and rear borders 16.1, 18.1, 16.2, 18.2 of the upper and lower panels 16, 18 are parallel to a horizontal transverse direction Y. The vertical direction Z is perpendicular to the directions X and Y.

The upper and lower panels 16, 18 and the front and rear spars 20, 22 each have an internal face (oriented toward the centre of the centre wing box) referenced as 161, 181, 201 and 221, respectively.

The internal faces 161, 181, 201 and 221 of the upper and lower panels 16, 18 and of the front and rear spars 20, 22 comprise stiffeners 24 parallel to the horizontal transverse direction Y and positioned inside the centre wing box 14.

Figure 7:
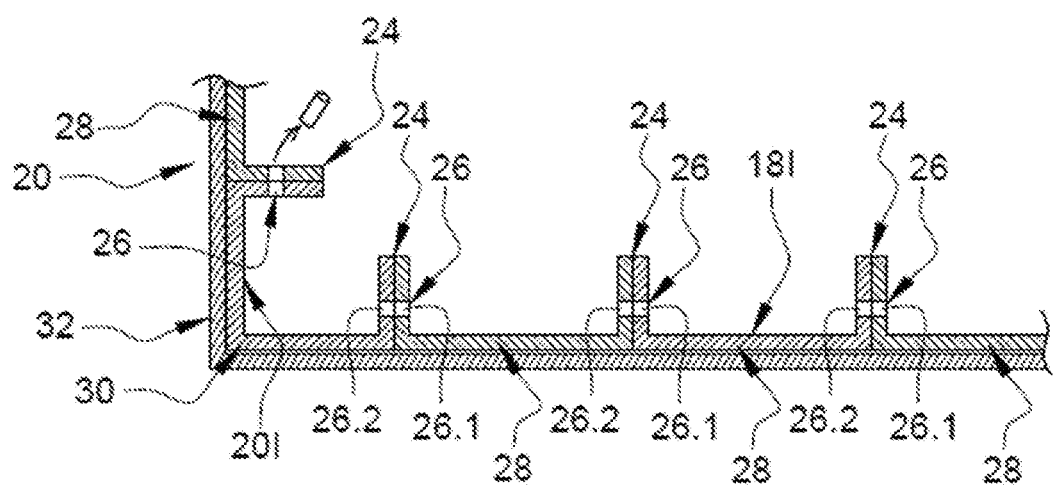
FIG. 7 is a section of a part of a centre wing box comprising stiffeners which have through-holes which illustrates an embodiment of the invention.

At least one of the stiffeners 24 comprises at least one through-hole 26, as illustrated in FIG. 7. According to one configuration, all of the stiffeners 24 provided at the inner face 181 of the lower panel 18 comprise one or more through-holes 26. Of course, the invention is not limited to this configuration. Thus, at least some of the stiffeners 24 provided on the inner faces 161, 201, 221 of the upper panel 16 and of the front and rear spars 20, 22 can comprise one or more through-holes 26.

According to one aspect of the invention, the centre wing box 14 is made of composite material.

Figure 6:
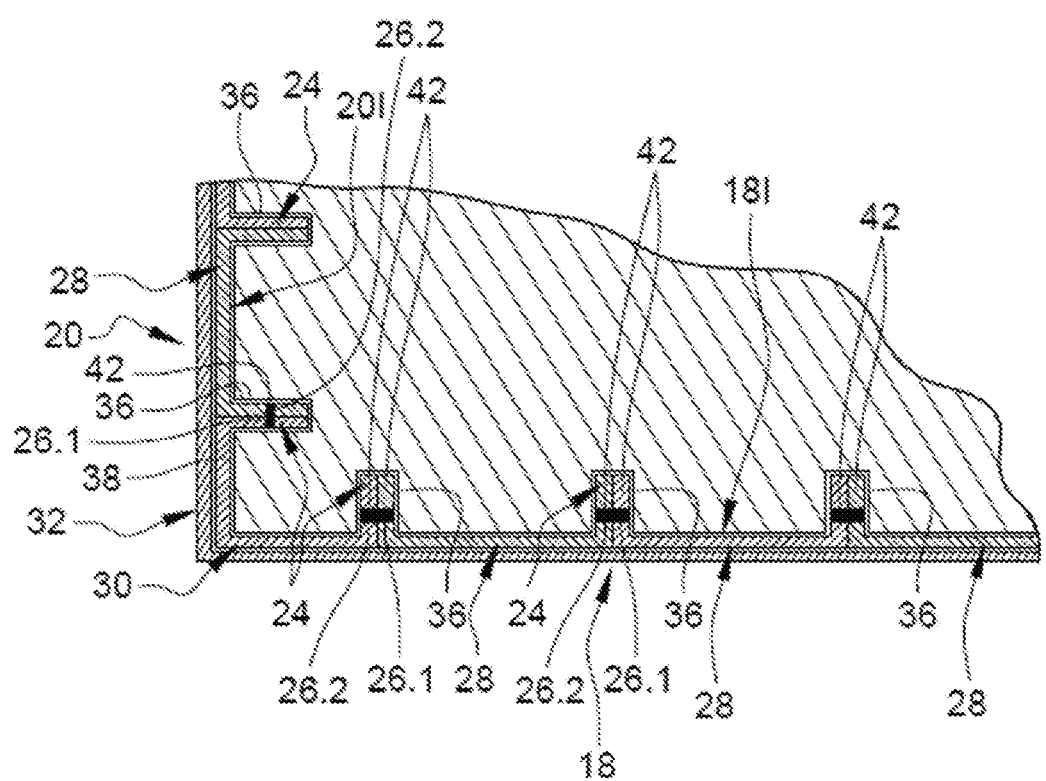
FIG. 6 is a section of a mould supporting U-shaped and C-shaped profiles, some of which comprise through-holes blocked by plugs which illustrates an embodiment of the invention.

As illustrated in FIG. 6, the centre wing box 14 is obtained from a plurality of U-shaped or C-shaped profiles 28, 30, made from composite material, on which an external skin 32 is formed from fibre reinforcements. The plurality of U-shaped or C-shaped profiles 28, 30, made from composite material, are positioned around a mould 34 (which can be seen in FIG. 2 in dot-and-dash line and partially in FIG. 6).

Fibre reinforcements means at least one fibre, a set of fibres, one or more fibre mini-sheets or one or more sheets.

The mould 34 comprises four faces 34.1 to 34.4 connected, in twos, at four edges 34.A1 to 34.A4 and arranged in the same way as the internal faces 161, 181, 201 and 221 of the upper and lower panels 16, 18 and of the front and rear spars 20, 22 of the centre wing box 14. According to one configuration, the mould 34 has a pivoting axis A34, parallel to the edges 34.A1 to 34.A4 and to the horizontal transverse direction Y, to allow the winding of the fibre reinforcements.

The mould 34 comprises grooves 36, parallel to the edges 34.A1 to 34.A4, provided at the faces 34.1 to 34.4 of the mould 34, one groove 36 for each stiffener 24.

The centre wing box 14 is obtained from U-shaped profiles 28 positioned parallel to the pivoting axis A34 at the faces 34.1 to 34.4 of the mould 34 and from C-shaped profiles 30 positioned parallel to the pivoting axis A34 at each of the edges 34.A1 to 34.A4 of the mould 34.

Figure 3:
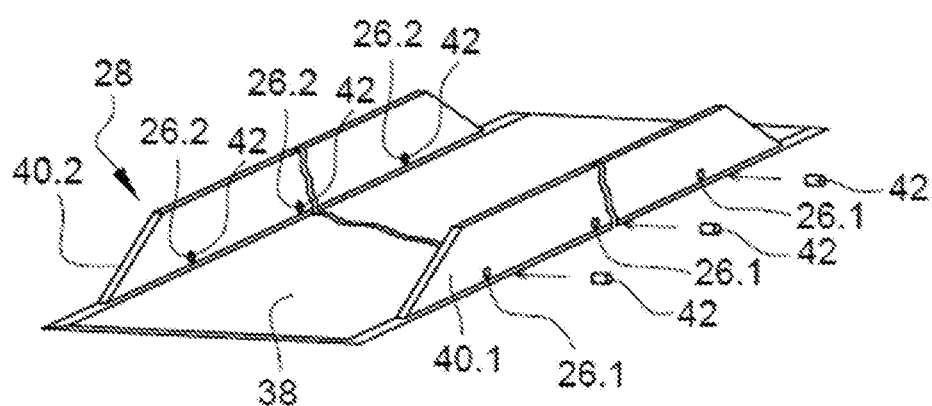
FIG. 3 is a perspective view of a U-shaped profile which illustrates an embodiment of the invention.

As illustrated in FIG. 3, each U-shaped profile 28 comprises a central part 38, also called the base, first and second legs 40.1 and 40.2 approximately perpendicular to the central part 38.

Figure 4:
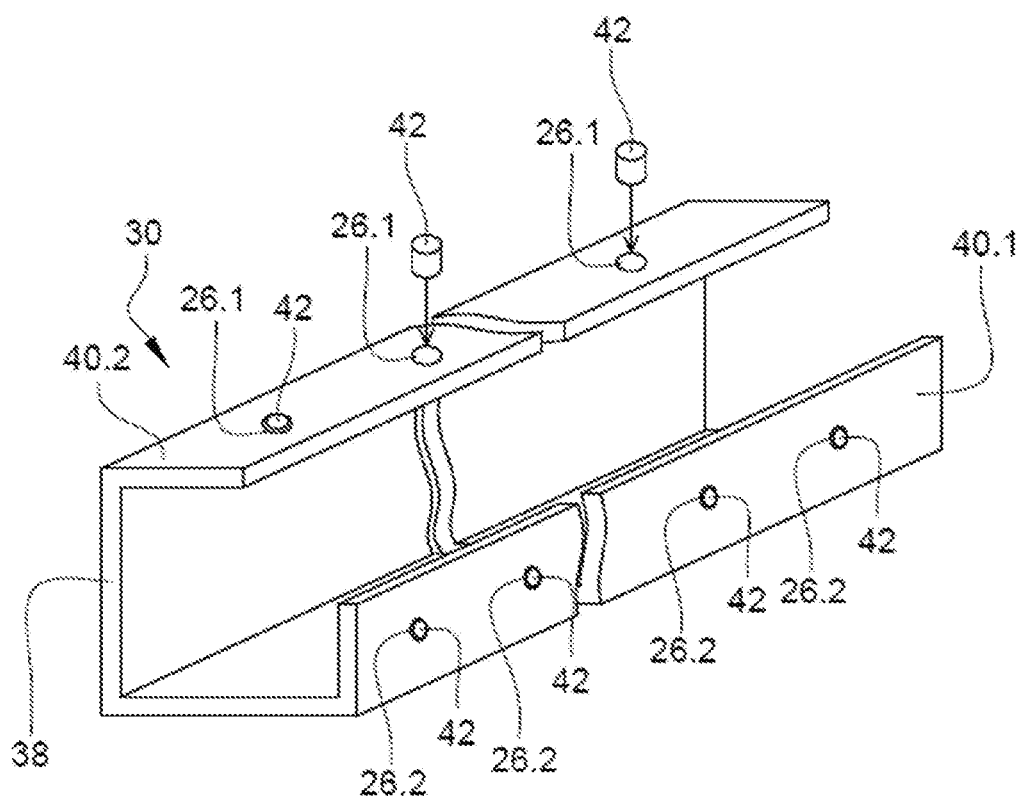
FIG. 4 is a perspective view of a C-shaped profile which illustrates an embodiment of the invention.

As illustrated in FIG. 4, each C-shaped profile 30 comprises an L-shaped central part 38, and first and second legs 40.1, 40.2 on either side of the central part 38.

As an estimate of size, each profile has a thickness of approximately 4 to 6 mm and the legs of the profiles 28, 30 have a height of approximately 45 mm.

Figure 5:
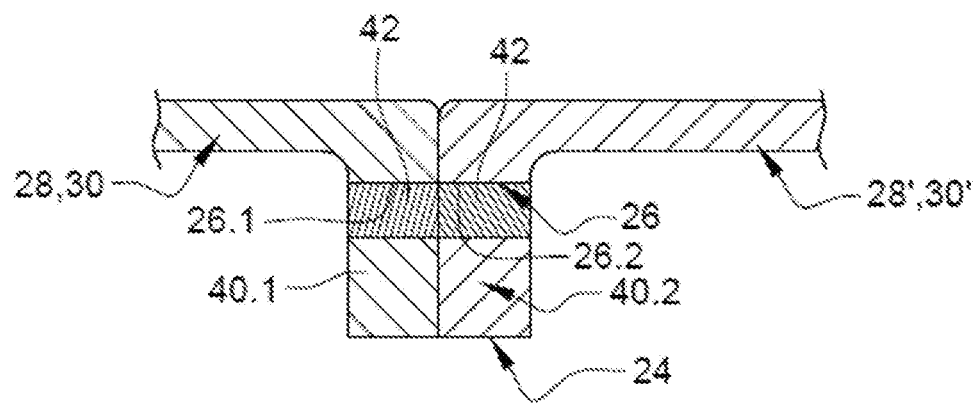
FIG. 5 is a section of two juxtaposed profiles provided with plugs which illustrates an embodiment of the invention.

As illustrated in FIG. 5, each stiffener 24 comprises a first leg 40.1 of a first U-shaped or C-shaped profile 28, 30 and a second leg 40.2 of a second U-shaped or C-shaped profile 28', 30' placed side by side against one another. For each through-hole 26 of the stiffener 24, the first leg 40.1 comprises a first section 26.1 of the through-hole 26 and the second leg 40.2 comprises a second section 26.2 of the through-hole 26, the first and the second sections 26.1, 26.2 of the through-hole 26 being approximately aligned when the first and second legs 40.1, 40.2 are placed side by side in order to form the stiffener 24.

The method for manufacturing the centre wing box 14 comprises, for each through-hole 26, the steps of producing a first section 26.1 of the through-hole 26 in the first U-shaped or C-shaped profile 28, 30 and of producing a second section 26.2 of the through-hole 26 in the second U-shaped or C-shaped profile 28', 30' before the first and second U-shaped or C-shaped profiles are positioned on the mould 34. The first and second sections 26.1, 26.2 are produced independently of one another, when the first and second profiles 28, 28', 30, 30' are not yet juxtaposed. These first and second sections 26.1, 26.2 are positioned on each of the first and second profiles 28, 28', 30, 30' such as to be aligned when the first and second profiles 28, 28', 30, 30' are juxtaposed in order to form the stiffener 24.

According to one embodiment, the first and second sections 26.1, 26.2 of each through-hole 26 are obtained by boring, by using a drill for example.

According to one mode of operation, the first and second sections 26.1, 26.2 of each through-hole 26 are produced before the U-shaped or C-shaped profiles 28, 28', 30, 30' are totally polymerized, particularly when they are raw or partially polymerized.

According to one embodiment, each U-shaped or C-shaped profile 28, 30 is a preform of pre-impregnated fibres that is produced by any appropriate means, in which the first and second sections 26.1, 26.2 of each through-hole 26 are produced.

According to a first embodiment of the invention, each first or second section 26.1, 26.2 of each through-hole 26 is filled in using a temporary plug 42 before the U-shaped or C-shaped profiles 28, 30 are positioned on the mould 34 and before they are totally polymerized, as is illustrated in FIGS. 3 and 4.

According to a second embodiment of the invention the first and second sections 26.1, 26.2 of each through-hole 26 is filled in using a temporary plug 42, after the U-shaped or C-shaped profiles 28, 30 are placed against one another in order to form a stiffener and before they are totally polymerized. According this second embodiment, the temporary plug 42 extend over the entire length of the first and second section 26.1, 26.2 of each through-hole 26. This second embodiment reduces the number of used temporary plugs 42.

Each temporary plug 42 has a cylindrical or conical shape and has a circular, oval, elliptical, or prismatic section. According the first embodiment, each temporary plug 42 has a height H substantially equal to the thickness T of the first or second leg in which the first or second section 26.1, 26.2 filled in by the temporary plug 42 is provided. According the second embodiment, each temporary plug 42 has a height substantially equal to the length of the through-hole 26 he is filled in.

According to a first alternative, each temporary plug 42 has a diameter equal to or very slightly less than that of the first or second section 26.1, 26.2 filled in thereby before the polymerization step. The gap between the temporary plug 42 and the first or second section 26.1, 26.2 is filled in after the polymerization step due to a phenomenon of expansion of the composite material.

According to another alternative, the temporary plug 42 has a diameter equal to or very slightly greater than that of the first or/and second section 26.1, 26.2 filled in thereby. According to this alternative, it is produced from a slightly compressible material such as to be insertable into the first or/and second section 26.1, 26.2 in the slightly compressed state. This configuration makes it possible to prevent the temporary plugs 42 from leaving the first and second sections 26.1, 26.2 when handling the U-shaped or C-shaped profiles 28, 30.

According to an embodiment, each temporary plug 42 is made of a material compatible with the pre-impregnated fibres of the U-shaped or C-shaped profiles 28, 30.

According to an embodiment, the temporary plug 42 is produced from silicone elastomer.

According to the first embodiment, the temporary plugs 42 have been put in place, the U-shaped and C-shaped profiles 28, 30 are juxtaposed entirely around the mould 34 such that the legs of two adjacent profiles are placed side by side against one another in order to form a stiffener 24 positioned in one of the grooves 36 of the mould 34 and such that the internal faces of the central parts 38 are pressed against the mould 34.

According to the second embodiment, the U-shaped and C-shaped profiles 28, 30 are juxtaposed entirely around the mould 34 such that the legs of two adjacent profiles are placed side by side against one another in order to form a stiffener 24 and the internal faces of the central parts 38 are pressed against the mould 34. The temporary plugs 42 are then put in place in each of the through holes 26.

After the U-shaped and C-shaped profiles 28, 30 have been put in place on the mould 34, the external skin 32 is laid on the external faces of the central parts 38. According to one mode of operation, the external skin 32 is obtained by winding fibre reinforcements around the mould 34 (which pivots around the pivoting axis A34), using at least one head for laying fibres or fibre roving.

After the external skin 32 has been put in place, drainage systems and a sealed envelope also called a bladder are put in place on the external skin 32, the sealed envelope being connected in a sealed manner to the mould 34 on either side of the external skin 32.

Advantageously, the mould 34 is sealed, has a length greater than that of the centre wing box 14 and extends on either side of the latter such as to offer, on either side, a contact surface to the bladder.

According to a first alternative, the external skin 32 is produced from pre-impregnated fibre elements.

According to a second alternative, the external skin 32 is produced from dry fibrous elements. In this case, a resin is injected or infused into the enclosure defined by the sealed mould 34 and the bladder.

The assembly formed by the mould 34, the U-shaped and C-shaped profiles 28, 30, the external skin 32, the drainage systems and the bladder is placed into an autoclave at 7 bar and subjected to a polymerization cycle in order to strengthen the centre wing box 14 by polymerization of the external skin 32. According to an alternative, the cohesion between the external skin 32 and the central parts 38 of the C-shaped and U-shaped profiles 28, 30 can be obtained by co-curing or by any other means.

The steps of putting in place the C-shaped and U-shaped profiles 28, 30 on the mould 34, the fibre reinforcements in order to form the external skin 32 on the central parts 38 of the C-shaped and U-shaped spars 28, 30, the drainage systems, and the sealed envelope are not described any further since they are known to a person skilled in the art.

After the polymerization thereof, the centre wing box 14 is removed from the mould and each temporary plug 42 is taken out, as illustrated in FIG. 7, such as to unblock the through-holes 26. The temporary plugs 42 are removed by hand or using a tool like a pin punch for example.

The method for carrying out the invention makes it possible to omit the steps of producing the through-holes after polymerization, inside the centre wing box. Moreover, the fact of producing the first and second sections 26.1, 26.2 of the through-holes 26 before the polymerization step makes it possible to omit the step for painting the through-holes.

Finally, the fact that the first and second sections 26.1, 26.2 of the through-holes 26 are produced independently of one another while the U-shaped or C-shaped profiles 28, 30 are not yet assembled makes it possible to simplify the boring step.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a centre wing box of an aircraft comprising stiffeners, at least one of said stiffeners having at least one through-hole, said centre wing box produced from a plurality of U-shaped and C-shaped profiles and from an external skin, the U-shaped or C-shaped profiles each having a central part and two legs on either side of the central part, the manufacturing method comprising:
- laying juxtaposed U-shaped and C-shaped profiles entirely around a mould such that first and second legs of two adjacent U-shaped or C-shaped profiles are placed side by side against one another in order to form a stiffener;
- laying the external skin on the central parts of the U-shaped and C-shaped profiles;
- polymerization; and
- removal from the mould,
- wherein, for each stiffener having at least one through-hole and comprising a first leg of a first U-shaped and C-shaped profile and a second leg of a second U-shaped and C-shaped profile, the method comprises, for each through-hole:
- producing a first section of the through-hole in the first U-shaped or C-shaped profile; and
- producing a second section of the through-hole in the second U-shaped or C-shaped profile before the first and second U-shaped or C-shaped profiles are positioned on the mould,
- wherein each first or second section of each through-hole is filled in using a temporary plug before the U-shaped or C-shaped profiles are positioned on the mould, each temporary plug completely removed after the step for polymerizing the centre wing box.

2. The method for manufacturing a centre wing box according to claim 1, wherein the first and second sections of each through-hole are produced before the U-shaped or C-shaped profiles are totally polymerized.

3. The method for manufacturing a centre wing box according to claim 1, wherein each temporary plug has a height substantially equal to a thickness of the first or second leg in which the first or second section filled in by the temporary plug is provided.

4. The method to manufacture a central wing box according to claim 1, wherein the first and second sections of each through-hole is filled in using a temporary plug, after the U-shaped or C-shaped profiles are placed against one another to form a stiffener, each temporary plug removed after the step for polymerizing the centre wing box.

5. The method to manufacture a central wing box according claim 4, wherein each temporary plug has a height substantially equal to the length of the through-hole the is filled in.

6. The method for manufacturing a centre wing box according to claim 1, wherein each temporary plug has a diameter equal to or less than that of the first or/and second section filled in thereby before the polymerization step.

7. The method for manufacturing a centre wing box according to claim 1, wherein each temporary plug has a diameter equal to or greater than that of the first or/and second section filled in thereby and wherein each temporary plug is produced from a compressible material so as to be insertable into the first or/and second section in a compressed state.

8. The method for manufacturing a centre wing box according to claim 7, wherein each temporary plug is produced from silicone elastomer.

9. The method for manufacturing a centre wing box according to claim 1, wherein each temporary plug has a cylindrical shape.

* * * * *